(12) United States Patent
Gandhi et al.

(10) Patent No.: US 12,289,558 B2
(45) Date of Patent: Apr. 29, 2025

(54) ARTIFICIAL INTELLIGENCE GENERATED DYNAMIC VIRTUAL BACKGROUNDS

(71) Applicant: Cisco Technology, Inc., San Jose, CA (US)

(72) Inventors: Indermeet Singh Gandhi, San Jose, CA (US); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 177 days.

(21) Appl. No.: 18/093,421

(22) Filed: Jan. 5, 2023

(65) Prior Publication Data
US 2024/0236259 A1 Jul. 11, 2024

(51) Int. Cl.
H04N 5/272 (2006.01)
G06V 10/70 (2022.01)
H04N 7/15 (2006.01)

(52) U.S. Cl.
CPC .......... H04N 5/272 (2013.01); G06V 10/768 (2022.01); H04N 7/15 (2013.01)

(58) Field of Classification Search
CPC .......... H04N 5/272; H04N 7/15; H04N 7/157; G06V 10/768
See application file for complete search history.

(56) References Cited

U.S. PATENT DOCUMENTS

| | | | |
|---|---|---|---|
| 2022/0070389 A1 | 3/2022 | Tangeland et al. | |
| 2022/0232189 A1 | 7/2022 | Swierk et al. | |
| 2022/0239847 A1 | 7/2022 | Swierk et al. | |
| 2022/0351434 A1* | 11/2022 | Springer | G06Q 10/101 |
| 2023/0063678 A1* | 3/2023 | Janus | H04N 9/643 |
| 2023/0126108 A1* | 4/2023 | Roper | G06T 7/90 |
| | | | 348/14.08 |
| 2023/0132407 A1* | 5/2023 | Lang | H04N 7/147 |
| | | | 348/580 |
| 2023/0316792 A1* | 10/2023 | Hu | G06V 30/19147 |

OTHER PUBLICATIONS

James Vincent, "Anyone can use this AI art generator—that's the risk," The Verge, https://www.theverge.com/2022/9/15/23340673/ai-image-generation-stable-diffusion-explained-ethics-copyright-data, Sep. 15, 2022, 33 pages.

(Continued)

*Primary Examiner* — Shahbaz Nazrul
(74) *Attorney, Agent, or Firm* — Edell, Shapiro & Finnan, LLC

(57) ABSTRACT

A request for a virtual background is received from an endpoint of a participant who is participating in an online meeting. The request includes a description of the virtual background. One or more virtual backgrounds are generated using an image generator based on a command that includes the description of the virtual background. The one or more virtual backgrounds are transmitted to the endpoint. A selection of the virtual background from the one or more virtual backgrounds is received and the selection is used to train the image generator. A request to use the virtual background may be received from a second participant of the online meeting and the virtual background or text used to generate the virtual background may be transmitted to the second participant.

20 Claims, 11 Drawing Sheets

(56) References Cited

OTHER PUBLICATIONS

"Using the Shared Backgrounds App," Zoom Support, https://support.zoom.us/hc/en-us/articles/4418661048077-Using-the-Shared-Backgrounds-App, Last updated: May 5, 2022, 2 pages.
Virtual Backgrounds for Work and Family Life, Bublup, bublup.com/blog/virtual-backgrounds-for-work-and-family-life/, Apr. 17, 2022, 8 pages.
Ashesh Anand, "AI in Interior Designing—Applications and Tools," Analytics Steps, https://www.analyticssteps.com/blogs/ai-interior-designing-applications-and-tools, Feb. 13, 2022, 8 pages.
"DALL-E 2," Open AI, https://openai.com/dall-e-2/, retrieved from the Internet on Nov. 9, 2022, 15 pages.
"DALL-E Now Available in Beta," Open AI, https://openai.com/blog/dall-e-now-available-in-beta/, Jul. 20, 2022, 5 pages.

* cited by examiner

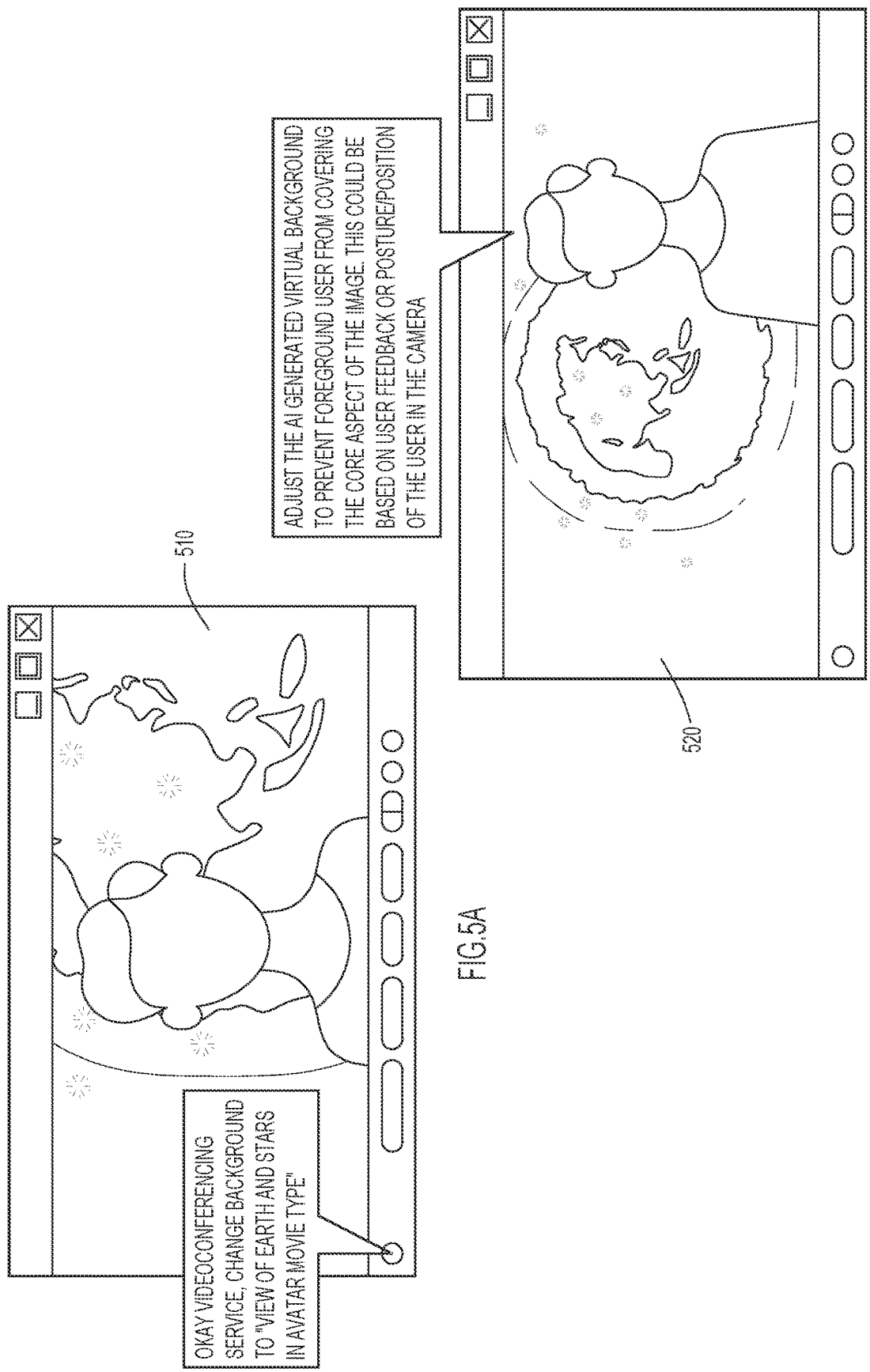

ARTIFICIAL INTELLIGENCE GENERATED DYNAMIC VIRTUAL BACKGROUNDS

TECHNICAL FIELD

The present disclosure relates to virtual backgrounds for online video meetings/conferences.

BACKGROUND

Virtual backgrounds allow participants of online meetings or communication sessions to choose the backgrounds that are shown behind them. Virtual backgrounds hide participants' real backgrounds and additionally allow users to be creative with the backgrounds and express their personalities. Currently, participants have to manually change the background and, in most video conferencing tools, a meeting opens by default with the same virtual background as in a previous meeting. Additionally, users are unable to dynamically update virtual backgrounds based on meeting context.

BRIEF DESCRIPTION OF THE DRAWINGS

FIGS. 5A and 5B show exemplary virtual backgrounds that are modified based on a user's position, according to an example embodiment.

DETAILED DESCRIPTION

Overview

Figure 1:
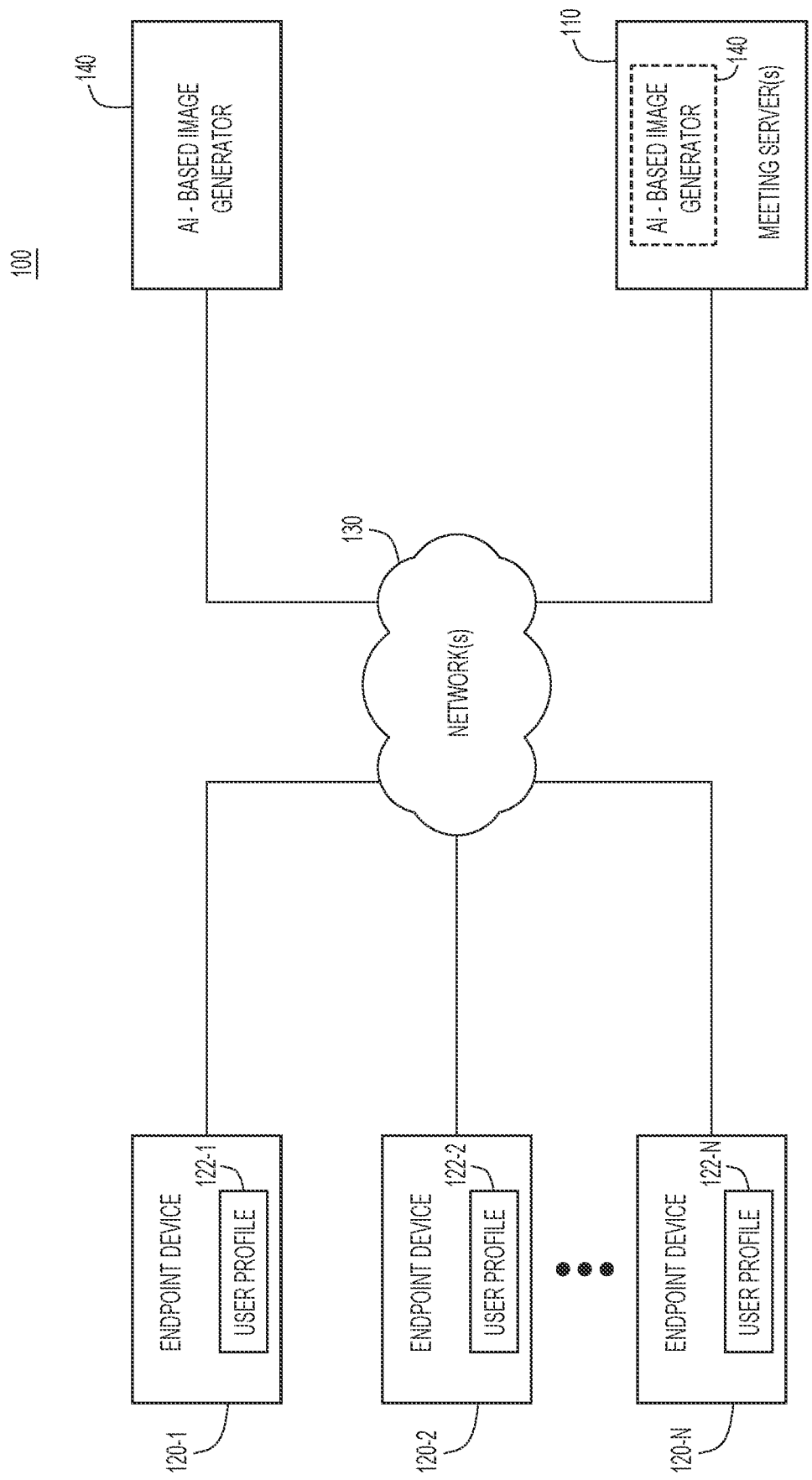
FIG. 1 is a block diagram of an online video conference/meeting system configured to support generating and providing an artificial intelligence (AI)-based virtual background based on a user description, according to an example embodiment.

In one embodiment, a method is provided for generating an AI-based virtual background based on a user description. The method includes receiving a request for a virtual background from an endpoint of a participant who is participating in an online meeting, the request including a description of the virtual background; generating, using an artificial intelligence (AI)-based image generator, one or more virtual backgrounds based on a command that includes the description of the virtual background; transmitting the one or more virtual backgrounds to the endpoint; receiving a selection of the virtual background from the one or more virtual backgrounds; and using the selection to train the AI-based image generator.

Example Embodiments

Using virtual backgrounds during online meetings has many advantages, especially for users who are working from home. For example, virtual backgrounds allow users or participants of online meetings to hide their real backgrounds, which helps to mitigate distractions from the users' real backgrounds. In addition, virtual backgrounds can be entertaining and allow users to be creative by choosing personal photos, other indoor or office settings, beaches or other exotic places, etc., as backgrounds.

The use of virtual backgrounds has several limitations. For example, a user's virtual background may default to the background used during a previous meeting. Users need to manually change their virtual backgrounds, which can take time and be distracting during a meeting. Users are unable to dynamically update the virtual background based on the meeting context. In addition, participants are unable to easily share their virtual backgrounds with other participants.

Presented herein are techniques for using text or voice commands to generate AI-based virtual backgrounds for online meetings. In accordance with embodiments provided herein, a request for an AI-generated virtual background may be received from a user or participant in an online meeting. The request may include a text or voice-based description of the virtual background. An AI-based image generator creates one or more virtual backgrounds based on the description. The user may choose one of the virtual backgrounds as the virtual background for the meeting. The user's selection may be used to train the AI-based image generator for generating subsequent virtual backgrounds.

In accordance with embodiments described herein, characteristics of the user's environment, such as light conditions and the user's posture/position, may be captured and incorporated into the request for the virtual background. Additionally, the user's environment conditions may be used to modify the virtual background during the online meeting. In accordance with some embodiments, closed captioning (CC) or audio from the online meeting may be used as a seed command to change the virtual background during the meeting. For example, keywords captured through the CC or meeting audio may be added to or replace previous keywords used in the request for the virtual background to create a new background. In this way, the user's virtual background may change as the user's environment conditions and/or meeting topics change.

In accordance with embodiments described herein, the user may label or otherwise denote/indicate the virtual background as available for sharing. When the virtual background is available for sharing, another participant may select and use the virtual background. When the other participant selects the virtual background, the virtual background or the text used to generate the virtual background may be shared with the other participant. When the other participant is using the virtual background, adjustment to the image or descriptive text may be made automatically based on personal preferences of the other participant or characteristics of the other participant's environment. In accordance with some embodiments, the participant and the other participant may combine virtual background images, text descriptors, or both to generate a composite virtual background. It is also envisioned that a user may share his/her virtual background with other users outside of or separate for any given online meeting.

Reference is first made to FIG. 1. FIG. 1 shows a block diagram of a system 100 that is configured to provide online meeting services with AI-based virtual backgrounds. The system 100 includes one or more meeting server(s) 110 and a plurality of endpoint devices 120-1 to 120-N (sometimes referred to herein individually as endpoint device 120 or collectively as endpoint devices 120) that communicate with meeting server(s) 110 via one or more networks 130. The meeting server(s) 110 are configured to provide an online meeting service for hosting a communication session among endpoint devices 120-1 to 120-N. The one or more meeting server(s) 110 additionally communicate with AI-based image generator 140 to provide virtual backgrounds to endpoint devices 120-1 to 120-N. In some embodiments, meeting server(s) 110 may communicate with AI-based image generator 140 via one or more network(s) 130. In other embodiments, meeting server(s) 110 may include AI-based image generator 140, as illustrated by the dashed lines around the AI-based image generator 140 in meeting server(s) 110.

Each of endpoint devices 120-1 to 120-N may be a tablet, laptop computer, desktop computer, smartphone, virtual desktop client, virtual whiteboard, or any user device now known or hereinafter developed. Endpoint devices 120-1 to 120-N may have a dedicated physical keyboard or touch-screen capabilities to provide a virtual on-screen keyboard to enter text. Endpoint devices 120-1 to 120-N may also have short-range wireless system connectivity (such as Bluetooth™ wireless system capability, ultrasound communication capability, etc.) to enable local wireless connectivity with a video endpoint device in a meeting room or with other user devices in the same meeting room. Endpoint devices 120-1 to 120-N may store content (e.g., a presentation, a document, images, etc.) for sharing the content with other user devices during an online meeting or communication session. In some embodiments, endpoint devices 120-1 to 120-N may be endpoint devices for facilitating communication with meeting server(s) 110 during the online meeting. Endpoint devices 120-1 to 120-N may additionally connect to user devices (not illustrated in FIG. 1) for sharing content stored on the user devices during the online meeting.

In some cases, endpoint devices 120-1 to 120-N may be videoconference endpoints designed for personal use (e.g., a desk device used by a single user) or for use by multiple users (e.g., a videoconference endpoint in a meeting room). In some embodiments, endpoint devices 120-1 to 120-N may be configured to open content to display or share (e.g., when a digital whiteboard is accessed directly on endpoint device 120).

Endpoint devices 120-1 to 120-N may include user profiles 122-1 to 122-N (sometimes referred to herein individually as user profile 122 or collectively as user profiles 122). A user profile 122 stores information associated with a user of an endpoint device 120 and preferences associated with the user. For example, a user profile 122 may store information indicating the user's preferred type of virtual background, elements the user does not like in a virtual background, aspects of a virtual background the user has chosen in the past, etc. In some embodiments, the user profile 122 may store commonly used descriptors and associated weights. Each time the user accepts or rejects a background or an element of a background, a matching weight may be modified accordingly. The data for each user profile may be stored locally at a given endpoint device, or stored by meeting server 110 on behalf of each user.

In the example illustrated in FIG. 1, a user of endpoint device 120-1 may request an AI-generated virtual background for display at the beginning of or during an online meeting or videoconference. The user may request the virtual background using, for example, voice or text instructions that describe the desired virtual background. If the user is using a text command, the user may select an option on a user interface indicating that the user is describing a desired virtual background. If the user is using a voice command, the user may select an option on the user interface or may speak a keyword or phrase to indicate that the user is going to give instructions. In this way, the client or application associated with the videoconferencing/online meeting service is able to parse the instruction from other speech uttered by the user. For example, if the user wants to change the virtual background to a home office with a white sofa, a bookshelf, with tulips and a table lamp on the desk, and a painting on the white colored wall, the user may say "Okay videoconferencing service, change background to home office with white sofa and bookshelf. There are tulips and a table lamp on the desk. On the white colored wall, there is a painting." The videoconferencing client or application may detect the words "Okay, videoconferencing service" and determine that the user is giving an instruction. In this case, the instruction is to change the background in the manner described by the user. The phrase "Okay, videoconferencing service" is exemplary and any suitable trigger phrase or keyword may be used.

Meeting server(s) 110 may receive the instruction from the user of endpoint device 120-1 and may generate a command for AI-based image generator 140. The command may include the description from the user and additional data. In one embodiment, the additional data may include user preference data. For example, meeting server(s) 110 may incorporate information from user profile 122 into the command. The information may indicate the user's likes and dislikes, preferences, etc.

In some embodiments, the additional data may include characteristics of an environment associated with the user of endpoint device 120-1. The characteristics may include, for example, light conditions or posture associated with the user. The posture may include elements such as the position of the user in the frame (e.g., seated toward the right of the screen, in the center of the screen, etc.), the user's general position (e.g., seating or standing), whether the user is facing left, right, or straight to the camera, the user frame occupation (e.g., close to the camera, occupying ⅔ of the screen, far from the camera, etc.), etc. The user's position may be detected in multiple ways. For example, if the back of the user's chair is detected, it may be determined that the user is seated. In another embodiment, background objects may be used to determine whether the user is seated or standing. For example, if the floor is visible a particular distance (e.g., 3 feet) behind the user, it may be determined that the user is seated.

Meeting server(s) 110 transmits the command to AI-based image generator 140 (e.g., via network(s) 130 when AI-based image generator 140 is external to meeting server(s) 110). AI-based image generator 140 generates one or more variations of the virtual background image using the user's description and the additional data and provides the one or more variations of the virtual background image to meeting server(s) 110. Meeting server(s) provides the virtual background images for display on endpoint device 120-1. In some embodiments, the virtual background images may include several variations of background images generated based on the command. In some embodiments, the virtual background images may include a primary image and variations of the primary image. The primary image may be a best guess at the user's preferred virtual background based on the user's preferences. In some embodiments, meeting server(s) 110 may additionally provide the user with additional images generated by other users using similar keywords. Although AI-based image generator 140 evolves using reinforcement learning, in some cases previously generated images most resonate with similar users.

The user of endpoint device 120-1 makes a selection based on the received virtual background images. The user may select one of the provided virtual background images, the primary image (i.e., if the user is provided a primary image), a variation of the primary image, one of the additional images, or the user may reject all of the virtual backgrounds. If the user selects one of the virtual backgrounds, the virtual background is set as the user's background for the online meeting.

Figure 2:
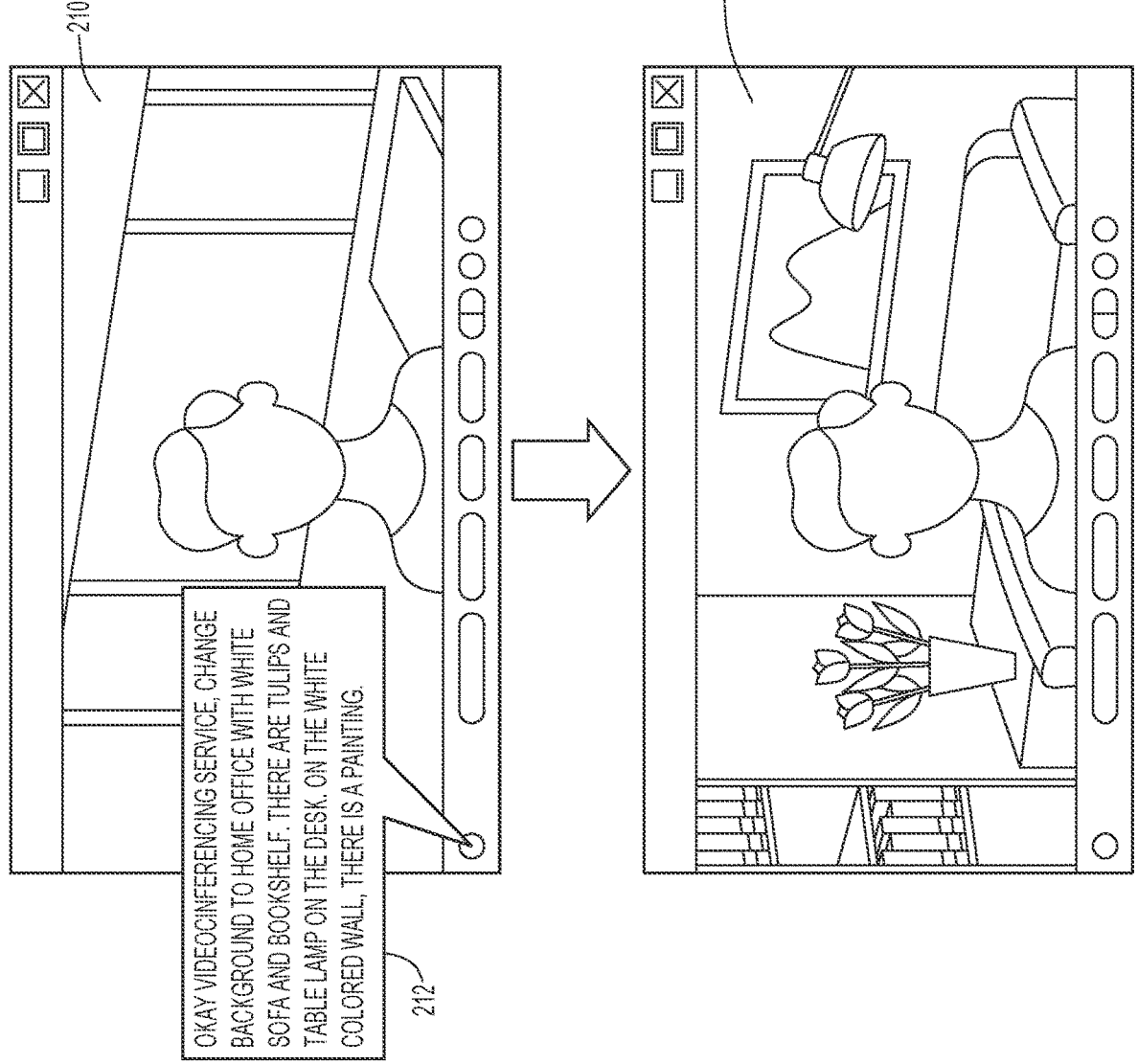
FIG. 2 shows an AI-generated virtual background that is generated based on a user description, according to an example embodiment.

Reference is now made to FIG. 2. FIG. 2 illustrates an example of a virtual background chosen by a user in response to a voice command describing the virtual background.

As illustrated in FIG. 2, image 210 shows a user with a first virtual background. At 212, the user uses a voice command to change the background to a new virtual background. The voice command is the same voice command in the example described with respect to FIG. 1. The voice command includes a keyword or phrase (e.g., "Okay Videoconferencing Service") to indicate that the user is going to give an instruction. The voice command additionally includes an instruction (e.g., "change background") and a description of the background ("home office with white sofa and bookshelf. There are tulips and table lamp on the desk. On the white colored wall, there is a painting.").

Image 220 illustrates the user with the virtual background that was generated based on the user's description and additional data (e.g., environmental conditions, user preferences, etc.). In some embodiments, the background is changed when the user selects the new virtual background. In other embodiments, the user may provide additional instructions to progressively change to the new background. For example, the user may say "Okay Videoconferencing Service, add tulips on the desk of my background and change to the new background progressively."

Referring back to FIG. 1, the user's feedback (i.e., selection or rejection of the virtual background images) is received at meeting server(s) 110. The user's positive or negative feedback is used to train the AI-based image generator 140. For example, reinforcement learning is used to train the AI-based image generator 140 for generating subsequent virtual background images for the user and for other users based on instructions from the user and other users. In addition, the user's feedback may be used to update user profile 122. For example, weights associated with descriptors of elements of the selected virtual background and the rejected virtual backgrounds may be updated in user profile 122.

In one or more embodiments, a user's virtual background may change during the online meeting if the characteristics of the user's environment (e.g., light conditions, posture, etc.) change. For example, if the light conditions or the user's position change during the meeting, aspects of the virtual background may change to accommodate the new user environment.

Figure 3A:
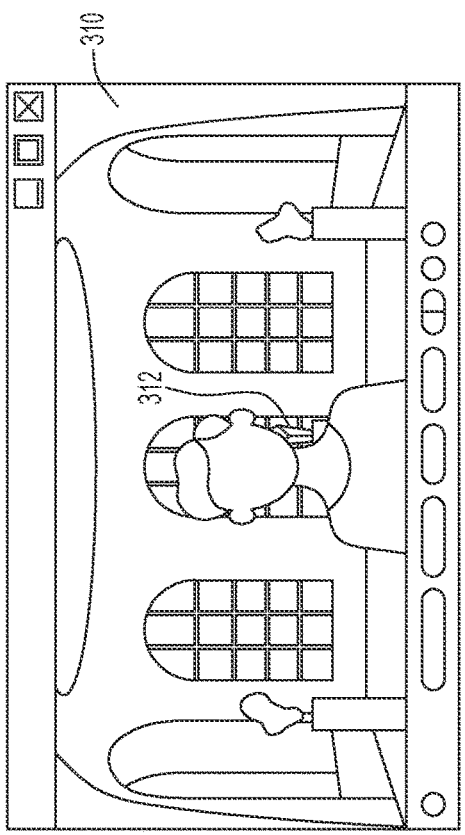
FIGS. 3A-3D show exemplary virtual backgrounds that are modified based on changes in a user environment, according to example embodiments.
Figure 3B:
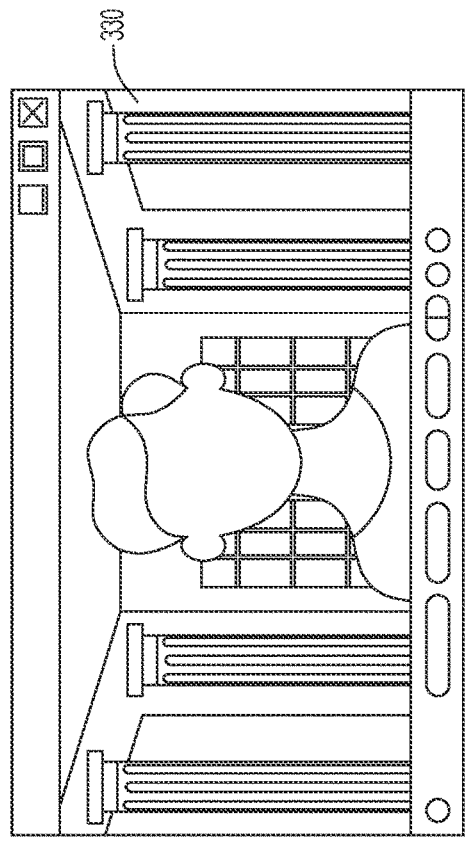
Figure 3C:
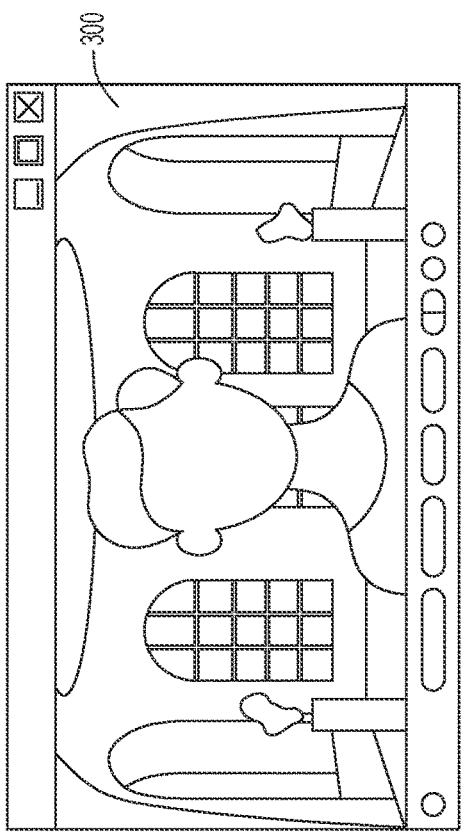

Reference is now made to FIGS. 3A-3C. FIGS. 3A-3C are images that depict how a user's virtual background may change as the user's position changes.

As shown in FIG. 3A, image 300 illustrates a user with a virtual background of a large room with statues. The virtual background of image 300 may have been generated based on the user saying, for example, "Okay videoconferencing service, change the background to something elegant." Meeting server(s) 110 may identify conditions associated with the user's environment (e.g., "the user is standing") and the user's preferences (e.g., elegant=museum, castle, yacht) and AI-based image generator 140 may generate the "large room in a museum with clear lighting" illustrated in image 300 based on the user's description, the environment conditions, and the user's preferences.

During the meeting, the user may move backward, as shown in image 310 of FIG. 3B, and a statue 312 behind the user may become visible and distracting. In this example, based on the user's new position, the virtual background image may be modified (e.g., to remove the statue at the center) or a new image may be created. The new image may be modified or a new image may be created, for example, by altering the description of the virtual background to remove the statue in the center (e.g., "a large room in a museum with clear lighting, no statue in the center"). FIG. 3C illustrates an image 320 in which a new virtual background with no statue in the center is generated. In other embodiments, the same room depicted in images 300 and 310 may be used, but the statue in the center may be removed.

In some embodiments, the virtual background image may additionally change based on user preferences. The user's preferences may be stored in a local profile, such as user profile 122. The profile may store commonly used descriptors and their associated weights for each user. Each time the user accepts or rejects a background or an element of a background, a matching weight may be modified accordingly.

Figure 3D:
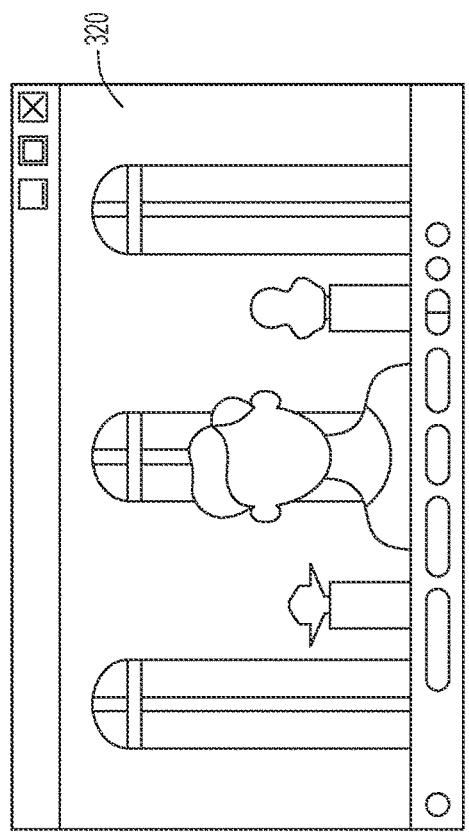

In this example, a user may say "Okay videoconferencing service, I don't like this background. I don't like museums. Give me something elegant, but not a museum." In this case, the description of the background may be modified to remove "museum" and replace it with, for example, a castle. For example, the modified description may say "a large room in a castle with clear lighting, no statue in the center." The virtual background may be replaced with image 330 shown in FIG. 3D, which illustrates a large room in a castle with no statue in the center.

If the user elects to use the castle background in image 330, the user profile 122 is additionally changed based on the selection. For example, for the word "elegant," a weight associated with "castle" increases and a weight associated with "museum" decreases. The weights may be used for generating future virtual backgrounds. For example, in the future, the user may be provided with virtual background images of castles instead of museums when the user requests an elegant background.

In one or more embodiments, automatic CC or meeting audio may be used as a seed command to change the background image. For example, if a user has selected an option to allow CC or meeting audio to be used to change the virtual background, keywords captured through CC or meeting audio may be added to or replace previous words in the user's description to create a new description. The new description may be used by AI-based image generator 140 to generate a new virtual background. In one embodiment, the new virtual background may automatically replace the previous virtual background during the meeting. In another embodiment, the user may be presented with options for replacing the virtual background and the user may select the new virtual background.

When the user has selected the option to change the virtual background based on CC or audio during the meeting, a CC or meeting audio filter may capture CC words and sort them into "relevant" and "irrelevant" categories. Relevant words may include directly descriptive words (e.g., blue, large, bright, etc.) or words that are associated with a background dictionary (e.g., "deep" may be associated with "space," "bad" may be associated with "dark," "go to market" may be associated with "space rocket," etc.). The background dictionary may be pre-created or built over time from previous associations. For example, assume it is determined that 78% of users who changed their backgrounds during a leadership meeting when the word "bonus" was spoken chose a green background. In this example, the word "green" gets a higher probability association to the word "bonus."

Figure 4:
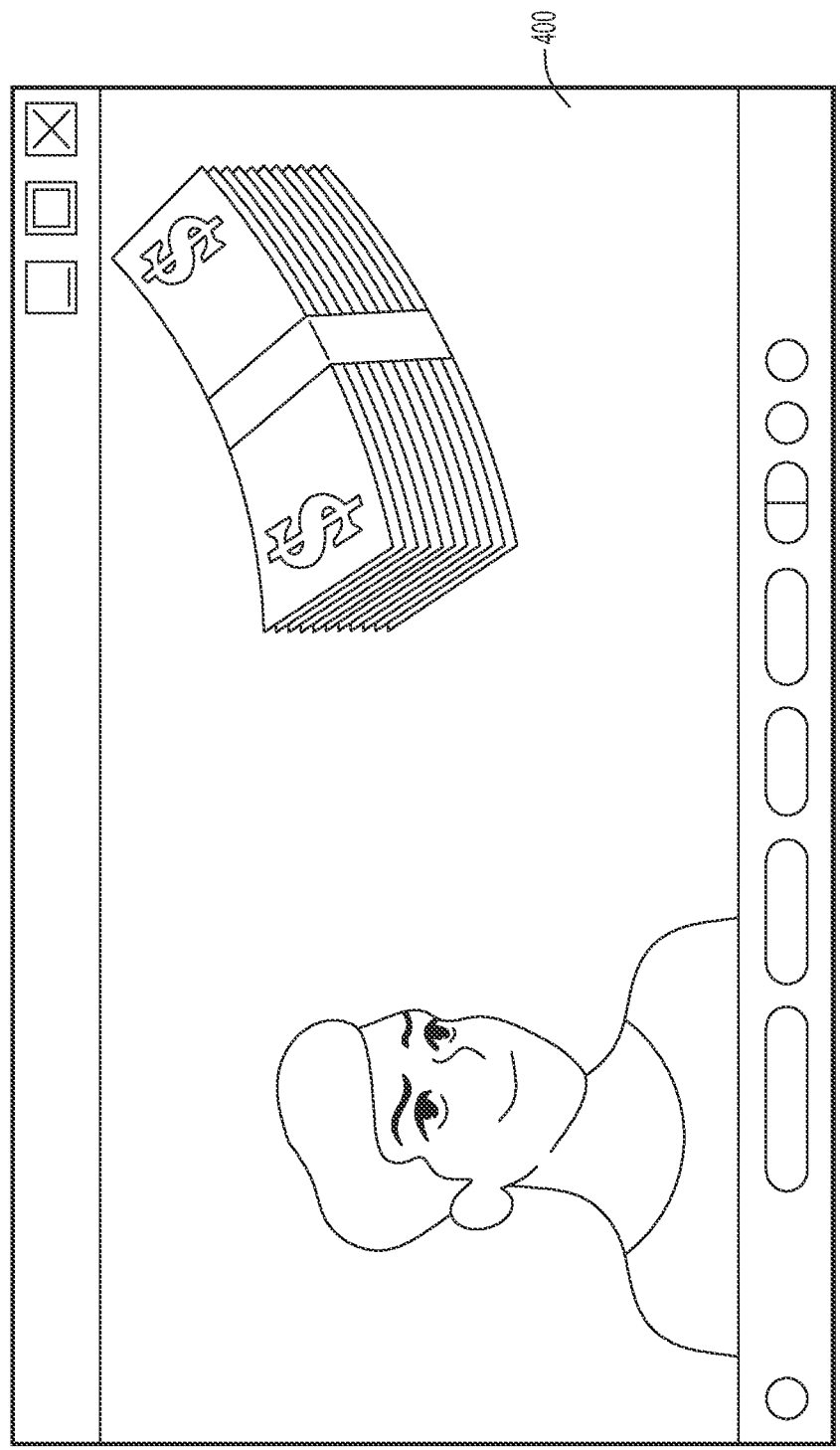
FIG. 4 shows an exemplary virtual background generated based on meeting audio or closed captioning, according to an example embodiment.

Reference is now made to FIG. 4. FIG. 4 illustrates a virtual background generated from CC or audio during an online meeting.

FIG. 4 shows image 400 that was generated using CC or meeting audio keywords as an input. In this example, a user may have selected an option to use CC or audio as a seed command to change the background image. During the meeting, the words "bonus," "increase," and "great year" may have been used. The user additionally may have given an instruction, such as by saying "Okay videoconferencing service, change the background to match that great news!"

In the image 400 shown in FIG. 4, the user is seated toward the left, looking at the screen on the upper right, and the lighting in the room is low. Based on user preferences, environmental conditions, and CC input, a description may be generated that says "a light grey wall with a pile of bills on the upper right side." The description may be generated, for example, by meeting server(s) 110. The virtual background image illustrated in image 400 shows a user looking toward a pile of bills on the upper right side.

In another embodiment, AI-based image generator 140 may create a virtual background that is based on the user's actual background. In this embodiment, endpoint device 120 may take a picture of the user's background with the user's permission. A meeting client or application may send the picture to an artificial intelligence markup language (AIML) tool, which returns a word description of the background. The user may modify the word description or the description may be modified (e.g., by meeting server(s) 110) based on user preferences and/or user environmental conditions. The word description (with or without modifications) may be transmitted to AI-based image generator 140 and AI-based image generator 140 may generate a virtual background based on the user's actual background.

The modifications may result in, for example, moving or shifting existing furniture or replacing furniture altogether. For example, a word string may be created that states "an office space in a typical mid-1930 French style" and the word string may be modified to state "an office space in a typical mid-1930 French style with a new modern bookshelf added to the right." In this example, a new modern bookshelf may be added to the user's real-life background. As another example, if a user's floor lamp is broken, the user may modify the word string describing the user's background to replace the antique lamp with a designer lamp.

Reference is now made to FIGS. 5A and 5B. FIGS. 5A and 5B illustrate images of virtual backgrounds in which core elements are adjusted based on user position and elements in the foreground.

FIG. 5A illustrates an image 510 with a virtual background generated based on the user speaking "Okay videoconferencing service, change the background to 'view of Earth and stars in an Avatar-type movie.'" The background in image 510 is generated without enhanced logic to prevent the foreground elements from covering the core elements of the virtual background image (in this case, Earth).

FIG. 5B illustrates an image 520 with the virtual background generated with enhanced logic to prevent the foreground from covering the core elements of the image. In this example, an adjustment in the virtual background is performed by meeting server(s) 110 by adjusting the text descriptor and/or the image using characteristics of the user environment and user posture/position. When using the enhanced logic, the meeting server(s) 110 take into account the image's existing visual elements (including shadows, reflections, and textures, etc.) to maintain the context of the original image when the image is adjusting to the user's environment.

As illustrated in image 520, the AI-generated virtual background is adjusted to prevent the foreground user from covering the core aspect of the image. The adjustment may be based on user feedback and/or posture/position of the user in the camera. In some embodiments, the virtual background may be expanded (e.g., using text descriptors) while maintaining the core elements of the original image. For example, a user may use original image/text descriptors to expand around the core elements, modify certain portions of the image, or use it as a seed to create a new virtual background altogether with the same theme.

Returning to FIG. 1, the user of endpoint device 120-1 may indicate that the virtual background is available for sharing. For example, the user may mark the virtual background as available for sharing with an internal organization or available for sharing with the internal organization and externally. The user may additionally make a selection indicating that the virtual background is available for sharing without approval or for sharing with approval. The meeting server(s) 110 or a local client/application associated with the meeting service may add a tag to the virtual background indicating that the virtual background is AI-generated. To prevent copyright issues, only AI-generated virtual backgrounds are available for sharing.

During the online meeting, a user of another endpoint device (e.g., endpoint device 120-2) may wish to use the virtual background generated by the user of endpoint device 120-1. The user of endpoint device 120-2 may select an option to obtain the AI-generated virtual background from the user of endpoint device 120-1. For example, the user of endpoint device 120-2 may click on the image of the user of endpoint device 120-1 during the online meeting and select an option from a menu to obtain the AI-generated virtual background. If the user of endpoint device 120-1 has not enabled the virtual background for sharing or if the user of endpoint device 120-1 has enabled the virtual background for sharing with an internal organization only and the user of endpoint device 120-2 is an external user, the option to obtain the virtual background may not be displayed or may not be selectable. When the user of endpoint device 120-1 has indicated that the virtual background is available for sharing with approval, the user of endpoint device 120-1 may receive an indication that the user of endpoint device 120-2 has requested to obtain the virtual background with an option to allow or deny the request.

When the user of endpoint device 120-1 has allowed the request (or the request is not needed), the user of endpoint device 120-2 may obtain the virtual background. In one embodiment, the entire virtual background image is shared and appears in the user profile 122-2 of the user of endpoint device 120-2, but is not yet activated. In another embodiment, the virtual background image is shared and is activated as the background for the user of endpoint device 120-2.

In another embodiment, instead of (or in addition to) the virtual background image being shared, the natural language processing (NLP) text that was used to generate the virtual background image is shared with the user of endpoint device 120-2. For example, the description and the additional data used to generate the virtual background may be shared with the user of endpoint device 120-2. In this embodiment, the user of endpoint device 120-2 may use the NLP text to generate variations of the virtual background image and select a variation to use as the virtual background. The user of endpoint device 120-2 may edit the NLP text to make a modification/personalization and use the modified text to generate a virtual background image. In this way, although there is a level of personalization with the newly generated virtual background, the base/core text remains the same between the users of endpoint devices 120-1 and 120-2.

Automatic adjustment to the virtual background image or descriptive text may occur for the user of endpoint device 120-2 based on the user's environment conditions (e.g., lighting, user's position/posture, etc.). For example, the virtual background image or descriptive text may be adjusted if the foreground covers an important or critical aspect of the image. In this embodiment, meeting server(s) 110 may derive text from the virtual background of the user of endpoint device 120-1, but modify the text to suit the environment of the user of endpoint device 120-2 to create a new AI-generated virtual background image. The general positions of the user of endpoint device 120-2 versus the user of endpoint device 120-1, the lighting in the rooms of the user of endpoint device 120-2 versus the user of endpoint device 120-1, etc., may be incorporated into the adding/modifying qualifiers when the image/text is derived for the user of endpoint device 120-2.

In addition, the user of endpoint device 120-2 may modify a certain portion of the virtual background image or the text. For example, the user of endpoint device 120-2 may say "Okay videoconferencing service, I don't need the antique lamp used in the image and want to change it to a designer lamp and add a bookshelf." In this example, the virtual background image may be modified based on the instructions from the user of endpoint device 120-2. The user of endpoint device 120-2 may use image or text descriptors from the user of endpoint device 120-1 to expand around the core elements, modify a certain portion of the image, or use it as a seed to create a new virtual background altogether with the same theme.

Figure 6A:
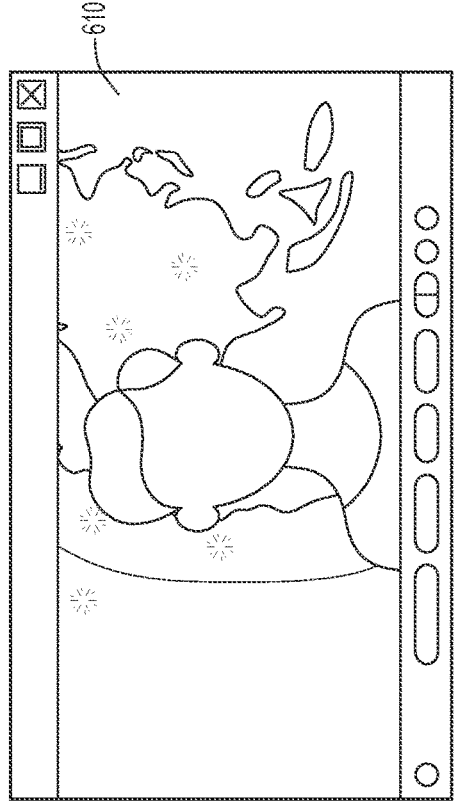
FIGS. 6A-6C show an exemplary virtual background generated by combining two virtual backgrounds, according to an example embodiment.
Figure 6B:
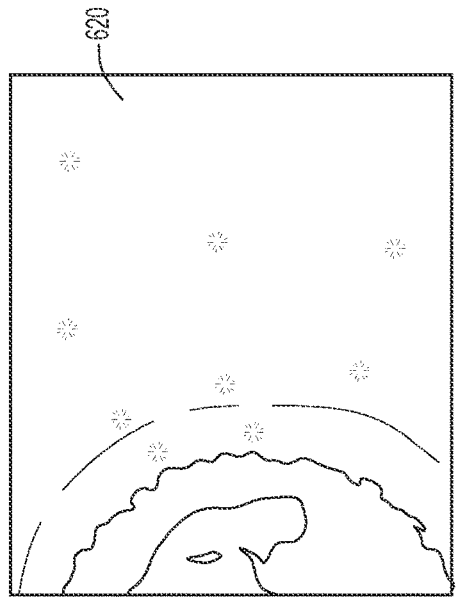
Figure 6C:
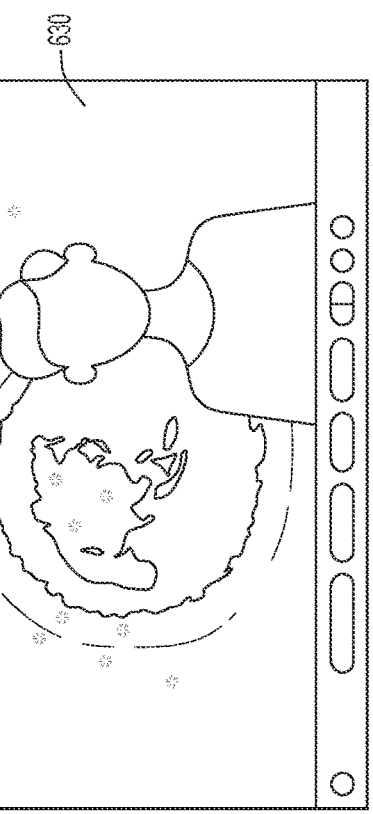

In one embodiment, two or more users may combine their images, text descriptors, or combinations of the images and text descriptors to generate a composite image for the virtual background. Reference is now made to FIGS. 6A-6C. FIGS. 6A-6C illustrate generating a composite image for the virtual background.

FIG. 6A illustrates an image 610 of a virtual background generated by a first user (e.g., a user of endpoint device 120-1) using the text "view of Earth and stars." FIG. 6B illustrates an image 620 of a virtual background generated for a second user (e.g., a user of endpoint device 120-2) using the text "Avatar movie type planet overlooking Earth." FIG. 6C illustrates an image 630 of a composite virtual background generated based on images 610 and 620. To generate the composite virtual background, meeting server(s) 110 may take into account the image's existing elements—including shadows, reflections, and textures—to maintain the context of the images when the two images are merged to suit the needs for the individual user's environment.

Figure 7:
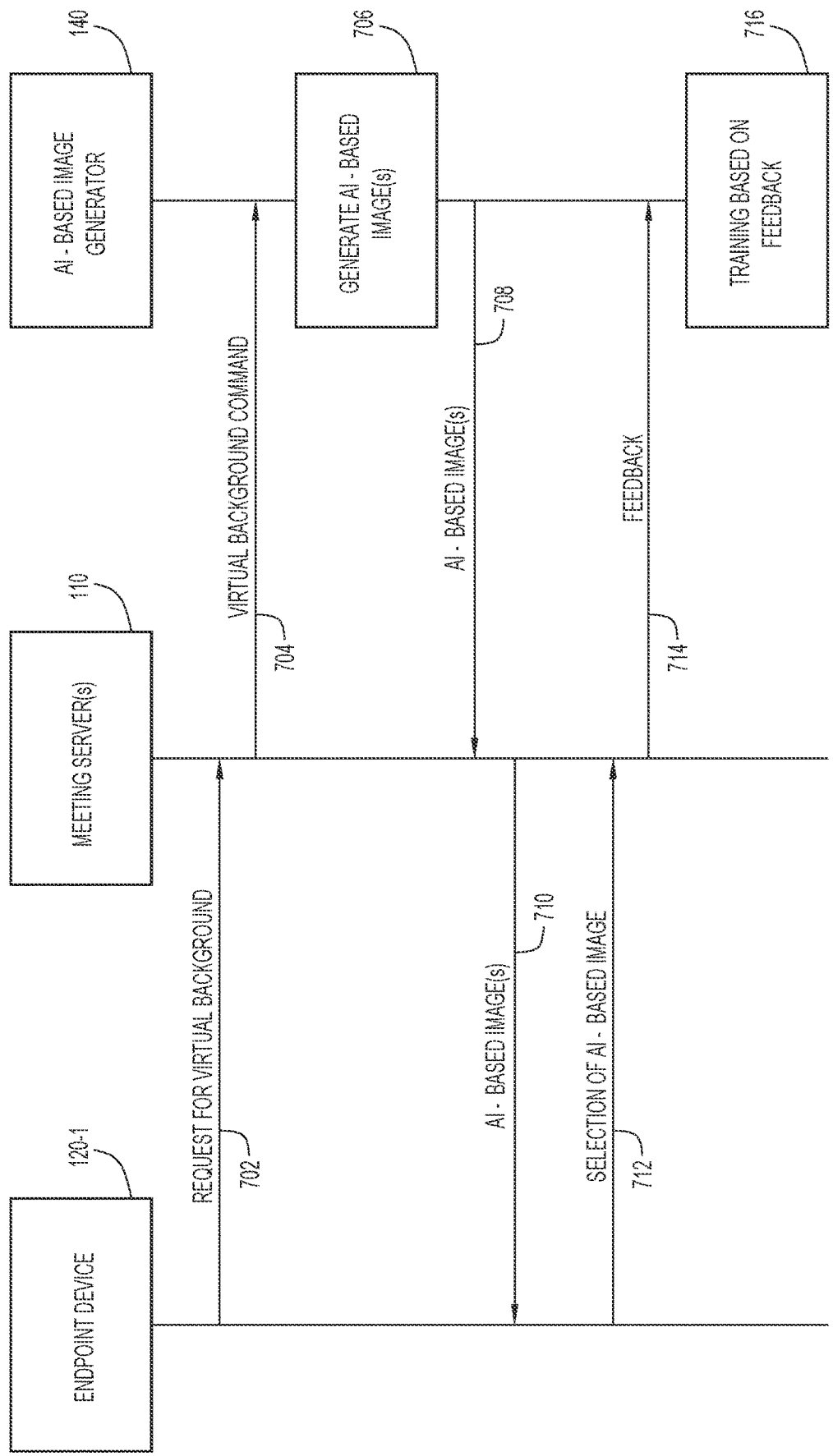
FIG. 7 is a message sequence diagram illustrating a call flow associated with generating and providing an AI-based virtual background based on a user description, according to an example embodiment.

Reference is now made to FIG. 7. FIG. 7 is a diagram illustrating communications among endpoint device 120-1, meeting server(s) 110, and AI-based image generator 140 when generating a virtual background based on a user request.

At 702, meeting server(s) 110 receives a request for a virtual background from endpoint device 120-1. For example, the user of endpoint device 120-1 may speak or type an instruction for a new virtual background that includes keywords or a description of the desired virtual background. At 704, meeting server(s) 110 may send a command for the virtual background to AI-based image generator 140. The command may include the keywords/description for the user as well as additional data, such as user preference information, environment conditions, user position, etc. At 706, AI-based image generator 140 may generate one or more AI-based virtual background images based on the command. In the case where AI-based image generator 140 is part of meeting server(s) 110, this step may be performed by an AI-image generator service at meeting server(s) 110.

At 708, AI-based image generator 140 may transmit the generated AI-based virtual background image(s) to meeting server(s) 110 and, at 710, meeting server(s) may transmit the AI-based virtual background image(s) to endpoint device 120-1. The images may include one or more variations of the virtual background image, a primary image, variations of the primary image, additional images generated by other users using similar keywords, etc. The user may select one of the images or reject all of the images. At 712, meeting server(s) 110 may receive an indication of the selection of an AI-based image for the virtual background (or an indication that the user has rejected all of the images). The user profile 122-1 may be updated based on the selected or rejected images or elements in the selected or rejected images. At 714, feedback regarding the user's selection is transmitted to AI-based image generator 140 and, at 716, AI-based image generator 140 is trained based on the user feedback. The AI-based image generator 140 evolves using reinforcement learning from feedback from users regarding new types of images generated.

Figure 8:
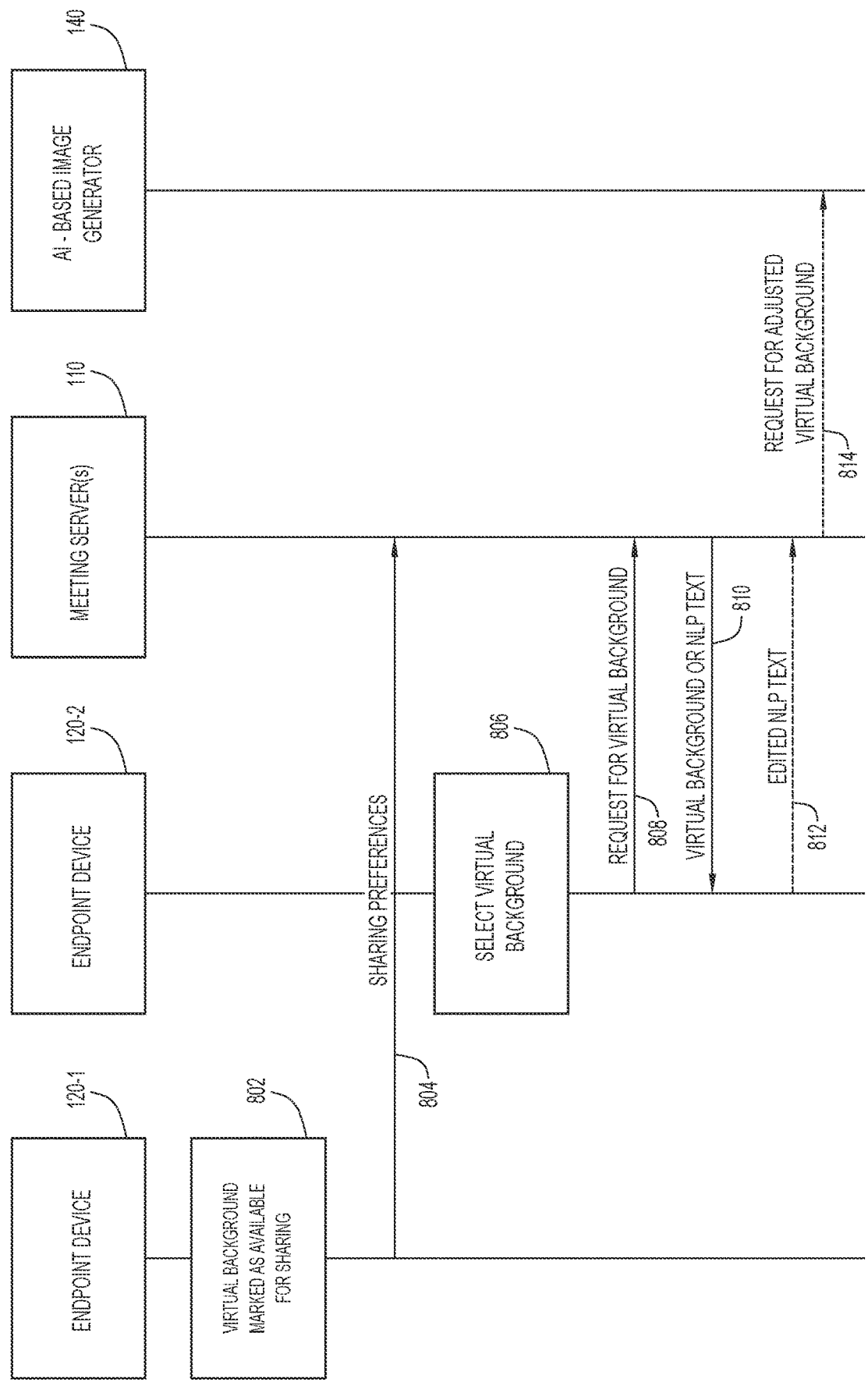
FIG. 8 is a message sequence diagram illustrating a call flow associated with a participant of an online meeting obtaining an AI-based virtual background from another participant of the online meeting, according to an example embodiment.

Reference is now made to FIG. 8. FIG. 8 is a diagram illustrating communications among endpoint device 120-1, endpoint device 120-2, meeting server(s) 110, and AI-based image generator 140 when sharing a virtual background between users.

In the example discussed in FIG. 8, a user of endpoint device 120-1 has obtained an AI-based virtual background based on a text or voice-based description. At 802, endpoint device 120-1 may mark the virtual background as available for sharing. For example, the user of endpoint device 120-1 may mark the virtual background as available for sharing with users of an internal organization or with users of the internal organization and external users. The user of endpoint device 120-1 may additionally provide a preference to share the AI-based virtual background with anybody without approval or to share the AI-based virtual background after approving requests from users. At 804, the user's sharing preferences are transmitted to meeting server(s) 110.

At 806, endpoint device 120-2 selects a virtual background to obtain. For example, a user of endpoint device 120-2 may click on an image of the user of endpoint device 120-1 and select an option to request or obtain the virtual background. In some embodiments, the user of endpoint device 120-1 may accept the request to obtain the virtual background. At 808, the request for the virtual background is transmitted to meeting server(s) 110.

If the request for the virtual background is approved or if no approval is needed, at 810, meeting server(s) 110 transmit (data describing/defining) the virtual background image or the NLP text used to generate the virtual background image to endpoint device 120-2. For example, the meeting server(s) 110 may store the background image or the text used to generate the virtual image for the user of endpoint device 120-1. In one embodiment, the meeting server(s) 110 may store a user account or file store for each user and the NLP text and/or background images may be stored in the user's user account or file store. When sharing of the virtual background is enabled (and possibly approved), the user of endpoint device 120-2 may obtain the text or background image from the user account associated with the user of endpoint device 120-1 at meeting server(s) 110. The NLP text and/or virtual image may then be stored in the user account of the user of endpoint device 120-2 at meeting server(s) 110.

In one embodiment, the entire virtual background image may be shared with the user of endpoint device 120-2 and the virtual background may appear in the user profile 122-2 of the user of endpoint device 120-2 and/or the virtual background image may be activated as the background for the user of endpoint device 120-2. In another embodiment, instead of (or in addition to) the virtual background image being shared, the description and the additional data used to generate the virtual background may be shared with the user of endpoint device 120-2.

In some embodiments, the user may edit the NLP text to create variations of the virtual background image. For example, the user of endpoint device 120-2 may edit the NLP text to make a modification/personalization and, at 812, the edited NLP text may be transmitted to meeting server(s) 110 to generate a modified/personalized virtual background image. At 814, a request for an adjusted virtual background may be transmitted to AI-based image generator 140. For example, automatic adjustment to the virtual background image or descriptive text may occur for the user of endpoint device 120-2 based on the user's environment conditions (e.g., lighting, user's position/posture, etc.). Meeting server(s) 110 may derive text from the NLP text of the virtual background of the user of endpoint device 120-1, but modify the text to suit the environment of the user of endpoint device 120-2 to create a new AI-generated virtual background image.

Although not illustrated in FIG. 8, AI-based image generator 140 may generate one or virtual background images based on the modified NLP text and transmit the one or more virtual background images to endpoint device 120-2 (e.g., via meeting server(s) 110 if AI-based image generator 140 is not a part of meeting server(s) 110). The user of endpoint device 120-2 may select a virtual background image and the selection may be used to train AI-based image generator 140, in a manner similar to the manner described above with respect to FIG. 7.

Figure 9:
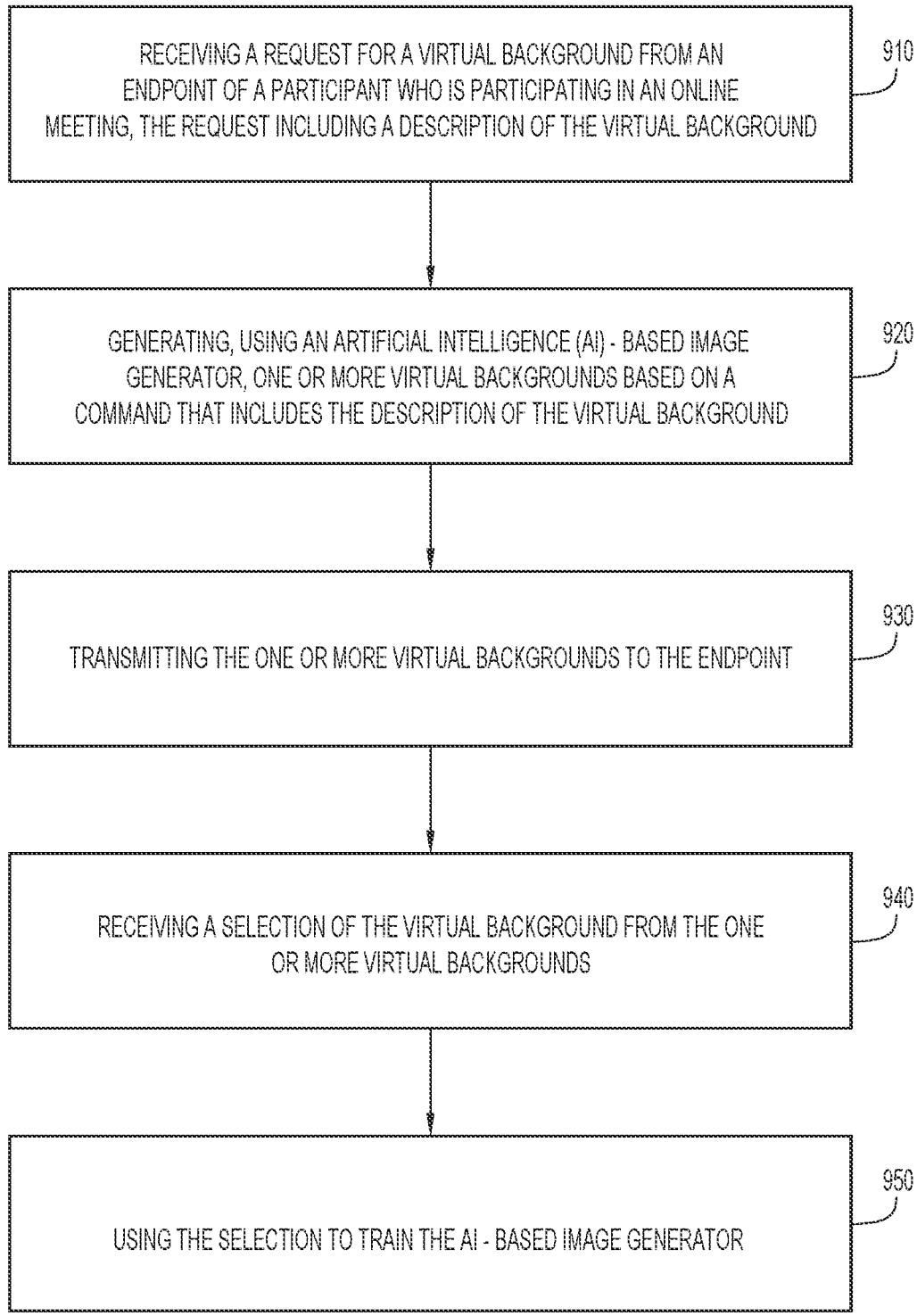
FIG. 9 is a flow diagram illustrating a method of generating and providing an AI-based virtual background based on a user description, according to an example embodiment.

Reference is now made to FIG. 9. FIG. 9 is a flow diagram illustrating a method 900 of obtaining an AI-based virtual background based on a user description of the virtual background, according to an example embodiment. Method 900 is performed by meeting server(s) 110 in combination with endpoint devices 120 and AI-based image generator 140.

At 910, a request for a virtual background is received from an endpoint of a participant who is participating in an online meeting. The request includes a description of the virtual background. At 920, one or more virtual backgrounds are generated based on a command that includes the description of the virtual background. The one or more virtual backgrounds are generated using an AI-based image generator. In an embodiment in which AI-based image generator 140 is remote from meeting server(s) 110, meeting server(s) 110 may transmit the command that includes the description of the virtual background to AI-based image generator for the virtual background and receive one or more virtual backgrounds from the AI-based image generator based on the request.

At 930, the one or more virtual backgrounds are transmitted to the endpoint. At 940, a selection of the virtual background from the one or more virtual backgrounds is received. For example, a user of endpoint device 120 may receive one or more virtual backgrounds (e.g., one or more variations of the virtual background, a primary virtual background and one or more variations of the primary virtual background, one or more virtual backgrounds previously selected by other participants, etc.) and may select one of the virtual backgrounds. At 950, the selection is used to train the AI-based image generator. For example, indications of the selected and rejected virtual backgrounds may be used to train the AI-based image generator when generating subsequent virtual backgrounds for the user and for other users.

Figure 10:
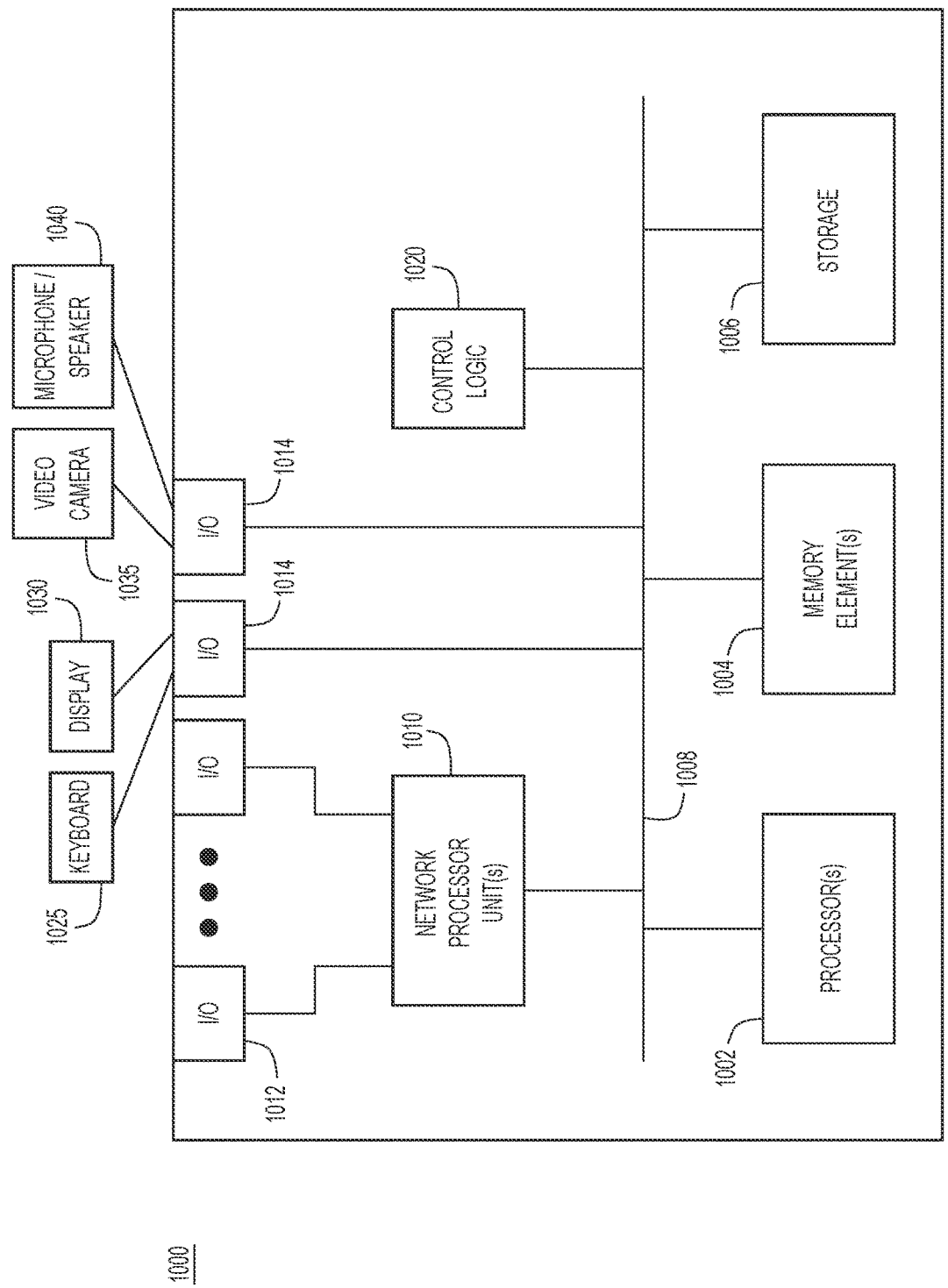
FIG. 10 is a hardware block diagram of a device that may be configured to perform the endpoint device-based operations involved in generating and providing an AI-based virtual background based on a user description, according to an example embodiment.

Referring to FIG. 10, FIG. 10 illustrates a hardware block diagram of a computing/computer device 1000 that may perform functions of a video endpoint device or an end device associated with operations discussed herein in connection with the techniques depicted in FIGS. 1, 2, 3A-3D, 4, 5A, 5B, 6A-6C, and 7-9. In various embodiments, a computing device, such as computing device 1000 or any combination of computing devices 1000, may be configured as any devices as discussed for the techniques depicted in connection with FIGS. 1, 2, 3A-3D, 4, 5A, 5B, 6A-6C, and 7-9 in order to perform operations of the various techniques discussed herein.

In at least one embodiment, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computer device 1000. For example, I/O interface(s) 1014 may provide a connection to external devices such as a keyboard 1025, keypad, a touch screen, and/or any other suitable input and/or output device now known or hereafter developed. This may be the case, in particular, when the computer device 1000 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 1030 shown in FIG. 10, particularly when the computer device 1000 serves as a user device as described herein. Display 1030 may have touch-screen display capabilities. Additional external devices may include a video camera 1035 and microphone/speaker combination 1040. While FIG. 10 shows the display 1030, video camera 1035 and microphone/speaker combination 1040 as being coupled via one of the I/O interfaces 1014, it is to be understood that these components may instead be coupled to the bus 1008.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 11:
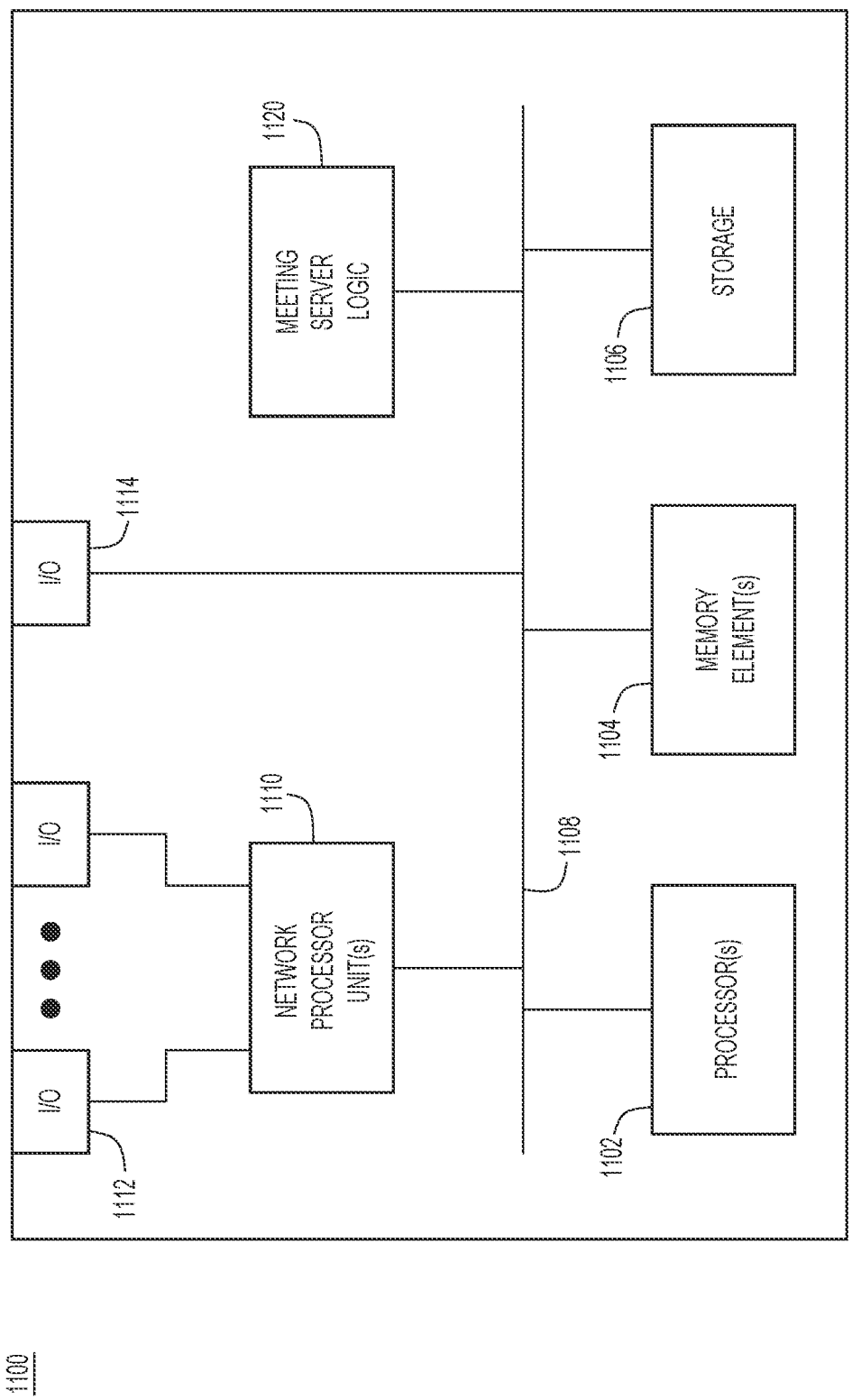
FIG. 11 is a hardware diagram of a computer device that may be configured to perform the meeting server operations involved in generating and providing an AI-based virtual background based on a user description, according to an example embodiment.

FIG. 11 illustrates a block diagram of a computing device 1100 that may perform the functions of the meeting server(s) 110 described herein. The computing device 1100 may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and meeting server logic 1120. In various embodiments, instructions associated with the meeting server logic 1120 is configured to perform the meeting server operations described herein, including those depicted by the flow chart for method 900 shown in FIG. 9.

In one form, a method is provided comprising receiving a request for a virtual background from an endpoint of a participant who is participating in an online meeting, the request including a description of the virtual background; generating, using an image generator, one or more virtual backgrounds based on a command that includes the description of the virtual background; transmitting the one or more virtual backgrounds to the endpoint; receiving a selection of the virtual background from the one or more virtual backgrounds; and using the selection to train the image generator.

In one example, description includes a text or voice-command based description In another example, the method further comprises receiving keywords obtained from audio during the online meeting; generating a new virtual background using the keywords; and changing the virtual background of the endpoint to the new virtual background. In another example, the command further includes user preferences associated with the participant. In another example, the command further includes characteristics of an environment associated with the endpoint.

In another example, the method further comprises identifying a change in a position of the participant with respect to a background; generating an updated virtual background based on the change in position; and changing the virtual background of the endpoint to the updated virtual background. In another example, the method further comprises receiving, from a second participant of the online meeting, a request to use the virtual background; and transmitting the virtual background or text used to generate the virtual background to the second participant.

In another form, an apparatus is provided including a memory; a network interface configured to enable network communication; and a processor, wherein the processor is configured to perform operations including: receiving a request for a virtual background from an endpoint of a participant who is participating in an online meeting, the request including a description of the virtual background; generating, using an image generator, one or more virtual backgrounds based on a command that includes the description of the virtual background; transmitting the one or more virtual backgrounds to the endpoint; receiving a selection of the virtual background from the one or more virtual backgrounds; and using the selection to train the image generator.

In yet another form, one or more non-transitory computer readable storage media encoded with instructions are provided that, when executed by a processor, cause the processor to execute a method including: receiving a request for a virtual background from an endpoint of a participant who is participating in an online meeting, the request including a description of the virtual background; transmitting a command to an image generator for the virtual background, the command including the description of the virtual background; receiving, from the image generator, one or more virtual backgrounds based on the request; transmitting the one or more virtual backgrounds to the endpoint; receiving a selection of the virtual background from the one or more virtual backgrounds; and using the selection to train the image generator.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
receiving a request for a virtual background from an endpoint of a participant who is participating in an online meeting, the request including a description of the virtual background;
generating, using an image generator, a plurality of virtual backgrounds based on a command that includes the description of the virtual background;
transmitting the plurality of virtual backgrounds to the endpoint;
receiving a selection of the virtual background from the plurality of virtual backgrounds;
using the selection to train the image generator; and
updating a profile associated with the participant with information associated with the selection.

2. The method of claim 1, wherein the description includes a text or voice-command based description.

3. The method of claim 1, further comprising:
receiving keywords obtained from audio during the online meeting;
generating a new virtual background using the keywords; and
changing the virtual background of the endpoint to the new virtual background.

4. The method of claim 1, wherein the command further includes user preferences associated with the participant.

5. The method of claim 1, wherein the command further includes characteristics of an environment associated with the endpoint.

6. The method of claim 1, further comprising:
identifying a change in a position of the participant with respect to a background;
generating an updated virtual background based on the change in position; and
changing the virtual background of the endpoint to the updated virtual background.

7. The method of claim 1, further comprising:
receiving, from a second participant of the online meeting, a request to use the virtual background; and
transmitting the virtual background or text used to generate the virtual background to the second participant.

8. An apparatus comprising:
a memory;
a network interface configured to enable network communication; and
a processor, wherein the processor is configured to perform operations comprising:
receiving a request for a virtual background from an endpoint of a participant who is participating in an online meeting, the request including a description of the virtual background;
generating, using an image generator, a plurality of virtual backgrounds based on a command that includes the description of the virtual background;
transmitting the plurality of virtual backgrounds to the endpoint;
receiving a selection of the virtual background from the plurality of virtual backgrounds;
using the selection to train the image generator; and
updating a profile associated with the participant with information associated with the selection.

9. The apparatus of claim 8, wherein the description includes a text or voice-command based description.

10. The apparatus of claim 8, wherein the processor is further configured to perform operations comprising:
receiving keywords obtained from audio during the online meeting;
generating a new virtual background using the keywords; and
changing the virtual background of the endpoint to the new virtual background.

11. The apparatus of claim 8, wherein the command further includes user preferences associated with the participant.

12. The apparatus of claim 8, wherein the command further includes characteristics of an environment associated with the endpoint.

13. The apparatus of claim 8, wherein the processor is further configured to perform operations comprising:
identifying a change in a position of the participant with respect to a background;
generating an updated virtual background based on the change in position; and
changing the virtual background of the endpoint to the updated virtual background.

14. The apparatus of claim 8, wherein the processor is further configured to perform operations comprising:
receiving, from a second participant of the online meeting, a request to use the virtual background; and
transmitting the virtual background or text used to generate the virtual background to the second participant.

15. One or more non-transitory computer readable storage media encoded with instructions that, when executed by a processor, cause the processor to execute a method comprising:
receiving a request for a virtual background from an endpoint of a participant who is participating in an online meeting, the request including a description of the virtual background;
transmitting a command to an image generator for the virtual background, the command including the description of the virtual background;
receiving, from the image generator, a plurality of virtual backgrounds based on the request;
transmitting the plurality of virtual backgrounds to the endpoint;
receiving a selection of the virtual background from the plurality of virtual backgrounds;
using the selection to train the image generator; and
updating a profile associated with the participant with information associated with the selection.

16. The one or more non-transitory computer readable storage media of claim 15, wherein the description includes a text or voice-command based description.

17. The one or more non-transitory computer readable storage media of claim 15, wherein the method further comprises:
receiving keywords obtained from audio during the online meeting;
transmitting a second command to the image generator using the keywords;
receiving a new virtual background from the image generator based on the second command; and
changing the virtual background of the endpoint to the new virtual background.

18. The one or more non-transitory computer readable storage media of claim 15, wherein the command further includes user preferences associated with the participant.

19. The one or more non-transitory computer readable storage media of claim 15, wherein the command further includes characteristics of an environment associated with the endpoint.

20. The one or more non-transitory computer readable storage media of claim 15, further comprising:
identifying a change in a position of the participant with respect to a background;
transmitting a new command to the image generator based on the change in position;
receiving an updated virtual background based on the new command; and
changing the virtual background of the endpoint to the updated virtual background.

* * * * *